United States Patent [19]

Curto

[11] Patent Number: 5,190,315

[45] Date of Patent: Mar. 2, 1993

[54] PASSIVE SAFETY BELT SYSTEM

[76] Inventor: Ennio Curto, Via E. di Velo, 84, 36100 Vicenza, Italy

[21] Appl. No.: 710,184

[22] Filed: Jun. 6, 1991

[30] Foreign Application Priority Data

Nov. 15, 1990 [IT] Italy ............................... 64261

[51] Int. Cl.⁵ ............................................ B60R 22/06
[52] U.S. Cl. .................................. 280/804; 180/269
[58] Field of Search ............... 280/804, 802, 803, 801, 280/808; 297/468, 469; 180/269, 270, 268

[56] References Cited

U.S. PATENT DOCUMENTS

| 3,680,883 | 8/1972 | Keppel et al. | 280/803 |
| 3,684,310 | 8/1972 | Weststrate | 280/803 |
| 3,881,745 | 5/1975 | Chavez, Jr. | 280/803 |
| 3,915,254 | 10/1975 | Nagano et al. | 280/804 |
| 4,222,586 | 9/1980 | Takada | 280/804 |
| 4,394,035 | 7/1983 | Sato | 280/804 |
| 4,585,251 | 4/1986 | Yoshitsugu et al. | 280/804 |
| 4,741,555 | 5/1988 | Frantom et al. | 280/804 |
| 4,765,651 | 8/1988 | Unger | 280/804 |
| 4,840,402 | 6/1989 | Yamamoto | 280/804 |

FOREIGN PATENT DOCUMENTS 136848  5/1989  Japan ................................. 280/804

Primary Examiner—Karin L. Tyson
Attorney, Agent, or Firm—Shlesinger, Arkwright & Garvey

[57] ABSTRACT

A passive safety seat belt system for an occupant on a seat of a motor vehicle having a frame and at least a door, comprises a first guide disposed on an outboard side of the seat secured to the frame below the door; a retractor adapted to move along the first guide between a first position behind the door and a second position in front of the door; a second guide disposed above the door; a buckle adapted to move along the second guide between a third position behind the door and a fourth position toward the front of the door; an anchor disposed inboard of the seat; a belt having a first end secured to the buckle, a second end operably secured to the retractor, and an intermediate portion operably secured to the anchor; a first drive operably associated with the retractor for positioning the retractor at the first and second positions; a second drive operably associated with the buckle for positioning the buckle at the third and fourth; whereby the belt secures the occupant to the seat when the retractor and the buckle are disposed at the first and third positions, respectively, and the belt is released from the occupant when the retractor and the buckle are disposed at the second and third positions, respectively.

9 Claims, 6 Drawing Sheets

PASSIVE SAFETY BELT SYSTEM

BACKGROUND OF THE INVENTION

Devices that protect the driver and the passenger of a motor car in case of a collision or crash are called passive restraint systems. One of these devices is the automatic seat belt, which must be fully automatic by definition of a passive restraint system, not requiring any manual action from the driver or the passenger to activate or to release (except in an emergency case).

The present state of the art provides no system which can be considered fully automatic. For example, a system called Motorized Shoulder Belt cannot be considered fully automatic because a separate lap belt has to be buckled manually, or other systems that operate from the movement of the body (3-point passive belts).

The present invention, as will be discussed hereunder, is fully automatic. The need for the present invention arises from the fact that a lot of people, for haste or negligence, do not buckle their seat belts, especially when driving a short distance, with the resultant risk to safety.

SUMMARY OF THE INVENTION

The present invention comprises an electric motor which moves a seat belt retractor from a bottom coupling point into another position beyond the hinged side of a car door. With the help of a sliding rod, the retractor's new position will mean that the seat belt and its corresponding coupling will be temporarily arranged in such a way as to make it easy for the driver or passenger to get out of the car without having to release the belt. This action occurs when the engine is turned off, or in the case of automatic cars, when the gear selector is placed in the park position. The safety belt top coupling is simultaneously moved by an electric motor along a guide rail, as in the case of the motorized shoulder belt, except that the belt does not need an emergency release, the belt remaining attached to the top coupling, passing through the coupling alongside the seat and securing to the retractor on the other side of the seat, such that as previously explained above for getting out of the car, no manual action is needed to release the safety belt.

The above situation is repeated on returning to the car, except that the safety belt couplings return to their original position when the engine is turned on, so that the safety belt can be used as established by road safety regulations.

The safety belt system of the present invention also has a device which uses the reduction in belt length during its passage from its operative or engaging position to its open or released position for raising the seat side sliding point sufficiently so as to make it much easier for the driver or passenger to get in or out of the car, with no hinderance from the belt.

There is also an electromagnetic device used in the present invention for locking the retractor and sliding bar assembly when the car is in motion. For the retractor, this creates no problem from the point of view of safety because the locking effect is linked to the brake; if this were not the case, all that is needed is to attach a small electromagnet to the locking system so as to make it free to unravel during the rapid movement described above.

In case of emergency, it is sufficient to press a conventional buckle release button disposed on the side coupling to insure instant release of the safety belt.

DETAILED DESCRIPTION OF THE INVENTION

Figure 1:
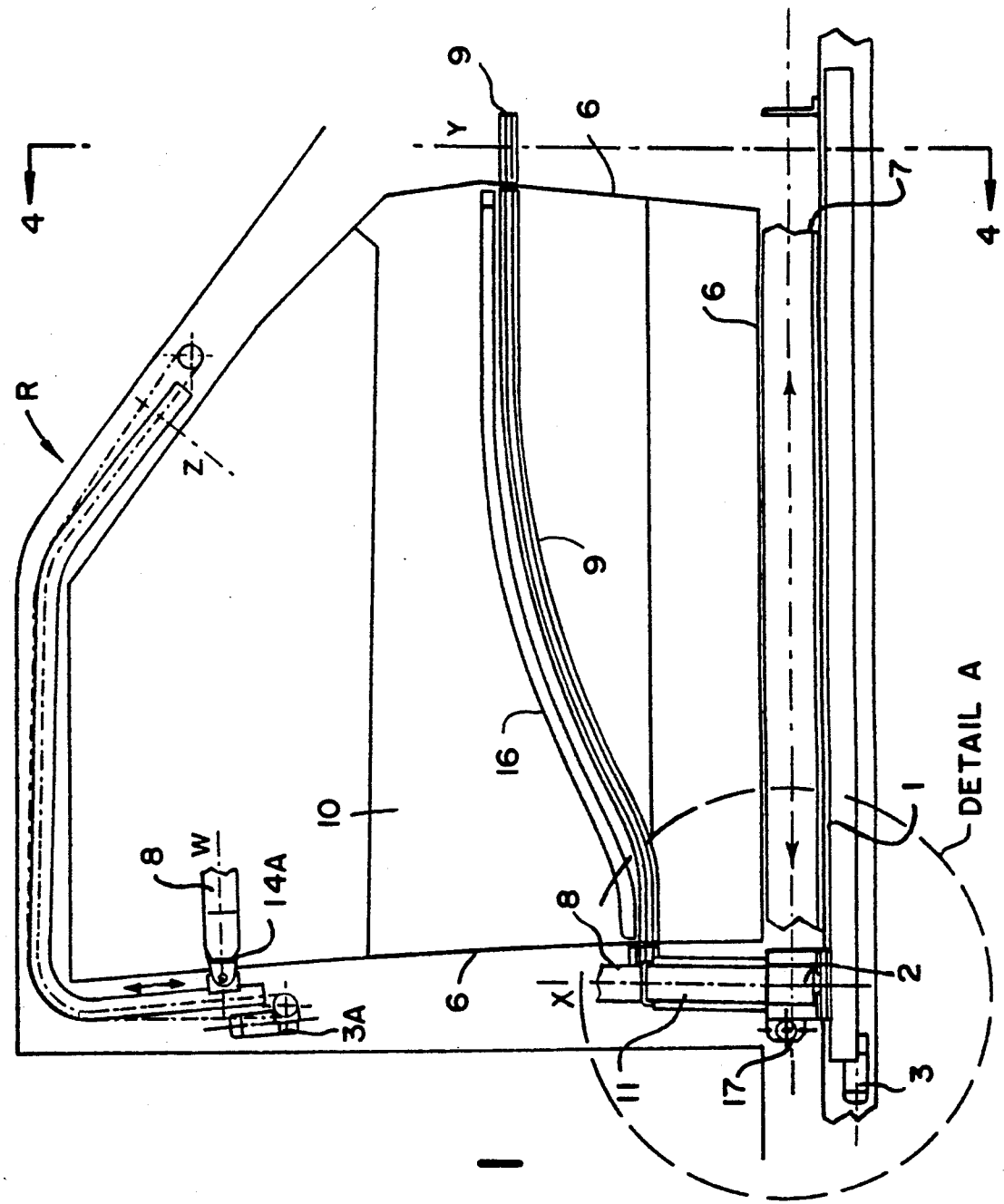
FIG. 1 is a fragmentary, inside, side elevational view of the driver's side of a vehicle utilizing a safety belt system in accordance with the present invention.
Figure 3:
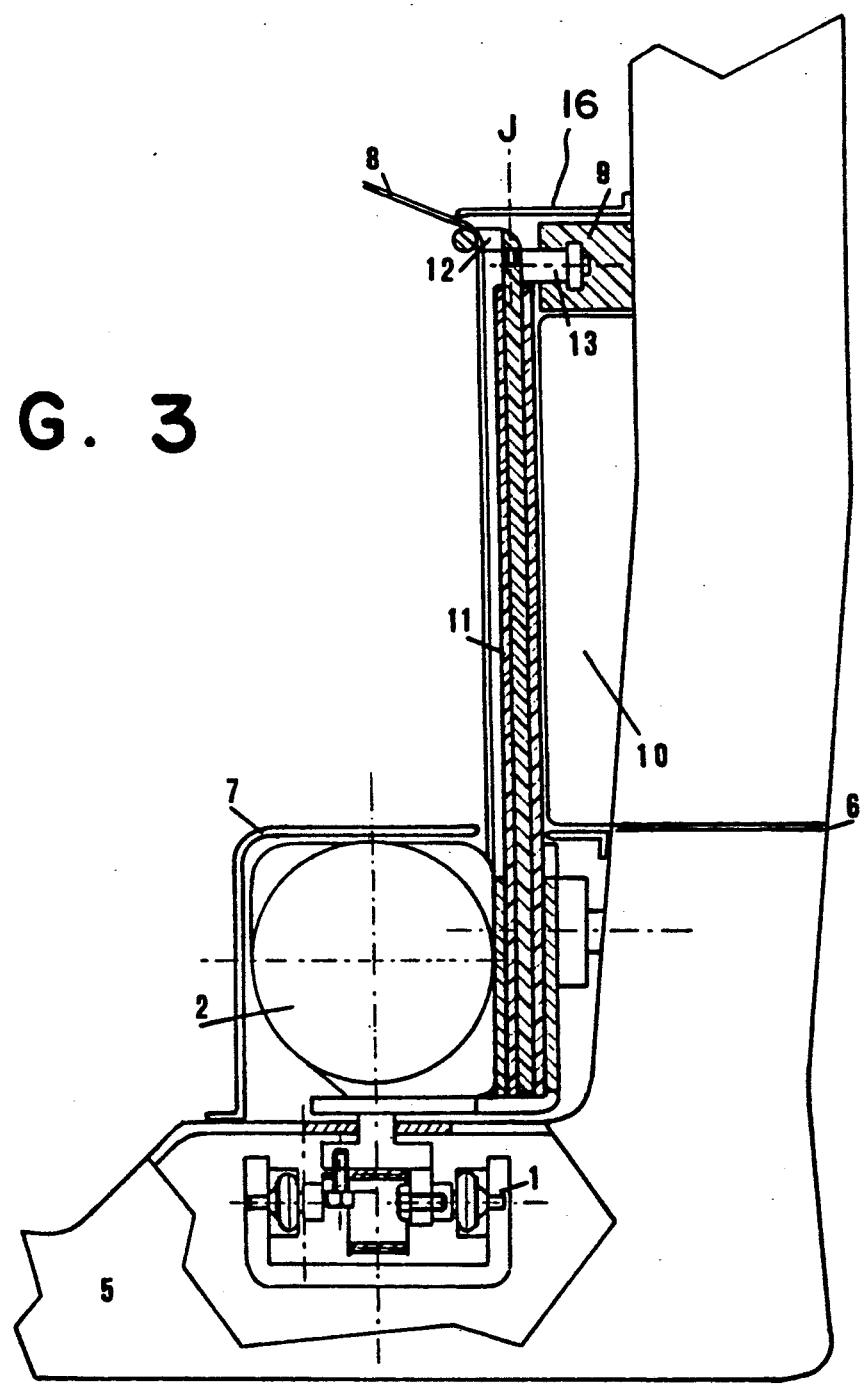
FIG. 3 is a cross sectional view taken along line 3—3 in FIG. 2.

A fully automatic seat belt system R is disclosed in FIG. 1, comprising a sliding rail 1 that allows for an automatic retractor 2 secured to a sliding bar 12 to shift from a X-axis position to a Y-axis position, driven by a motor 3 engaged to a toothed belt 4. The sliding retractor assembly 2 is attached to a floor 5 of the car, as best shown in FIG. 3, and to an edge of door frame 6. A cover 7 is provided to ensure that the movement of the retractor 2 is safe for the driver and the passenger. The sliding bar 12 slides on the level of the door 10.

The seat belt system R is based on the shifting of the retractor 2. A safety belt 8 is guided by a profile 9 into positions which leave the driver's body free to move. At the same time, the retractor 2 moves into the Y-axis position beyond the hinged side of the door 10 so that the door 10 can be opened and the driver and the passenger can get out with ease. Of course, this takes place with the engine turned off or when the car with an automatic gear box is shifted into a parking position.

Figure 2:
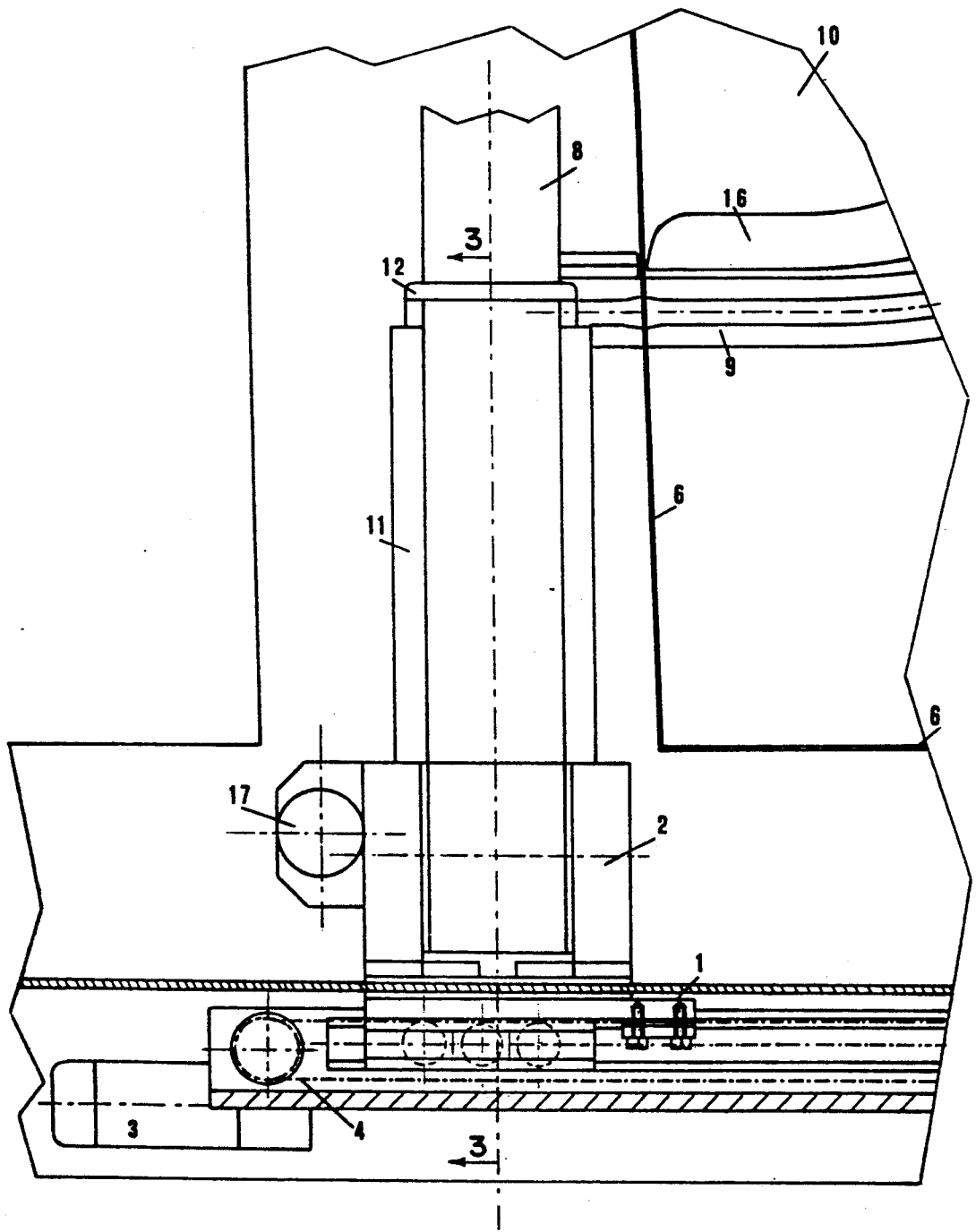
FIG. 2 is an enlarged view, with portions shown in cross section, of detail A in FIG. 1.

The retractor 2, as best shown in FIG. 2, is a standard automatic retractor fitted with a bracket supporting a container 11 for the telescopic sliding rod 12. The position of the top of the telescopic rod 12 is adjustable along a J axis, as best shown in FIG. 3. The sliding bar 12 has a pin 13 inserted in the profile 9, as best shown in FIG. 3.

When the car is in motion, the retractor 2 and the sliding bar 12 will be in the X-axis position, as best shown in FIG. 1. The safety belt 8 will be positioned symmetrically at the same height as a fixing rod anchor 14 placed on the other side of the seat, which insures proper positioning of the lap belt portion of the safety belt 8 at position K1, as best shown in FIG. 4.

Figure 4:
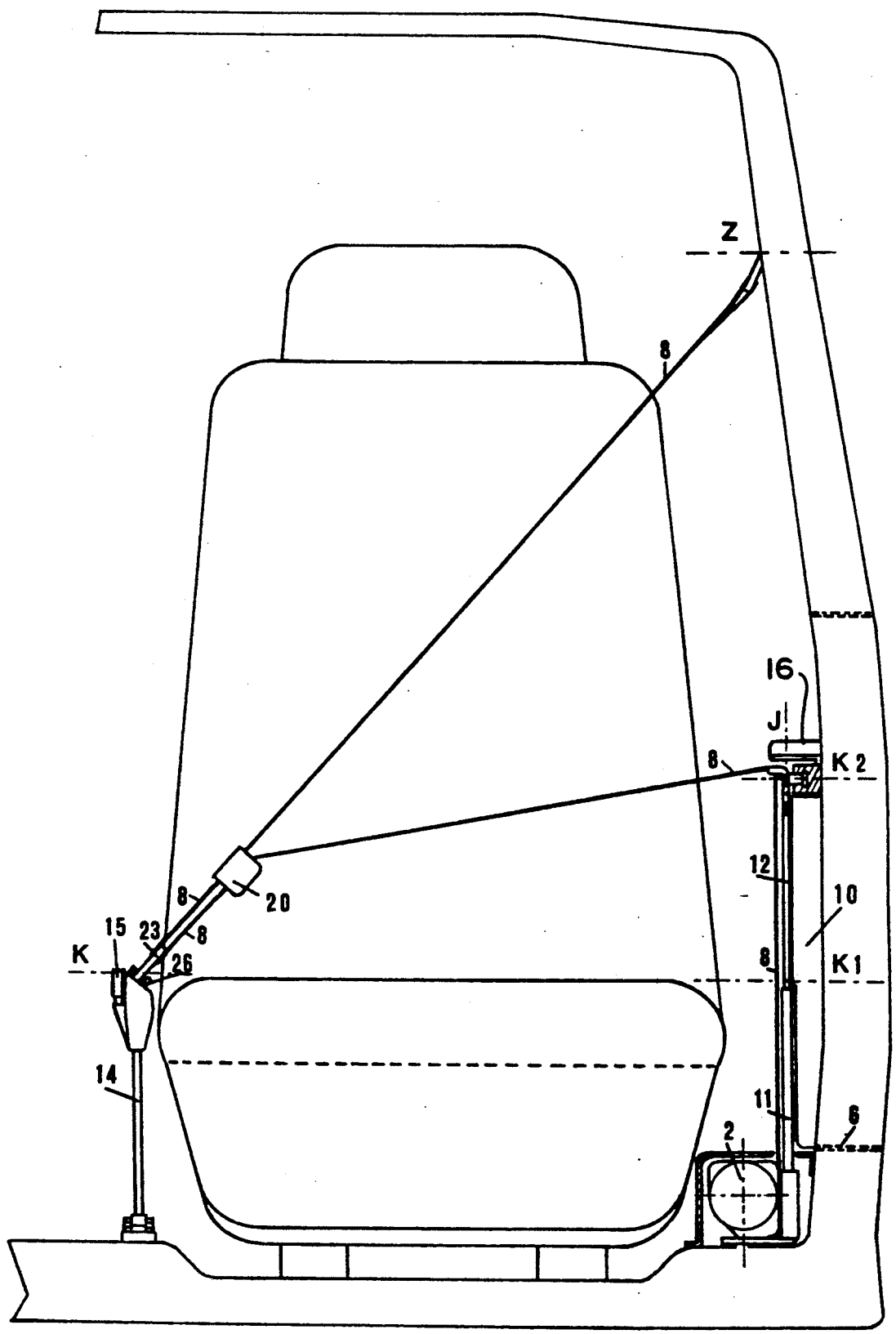
FIG. 4 is an enlarged cross sectional view taken along line 4—4 in FIG. 1, showing the retractor-sliding rod set positioned in the Y-axis in FIG. 1.
Figure 5:
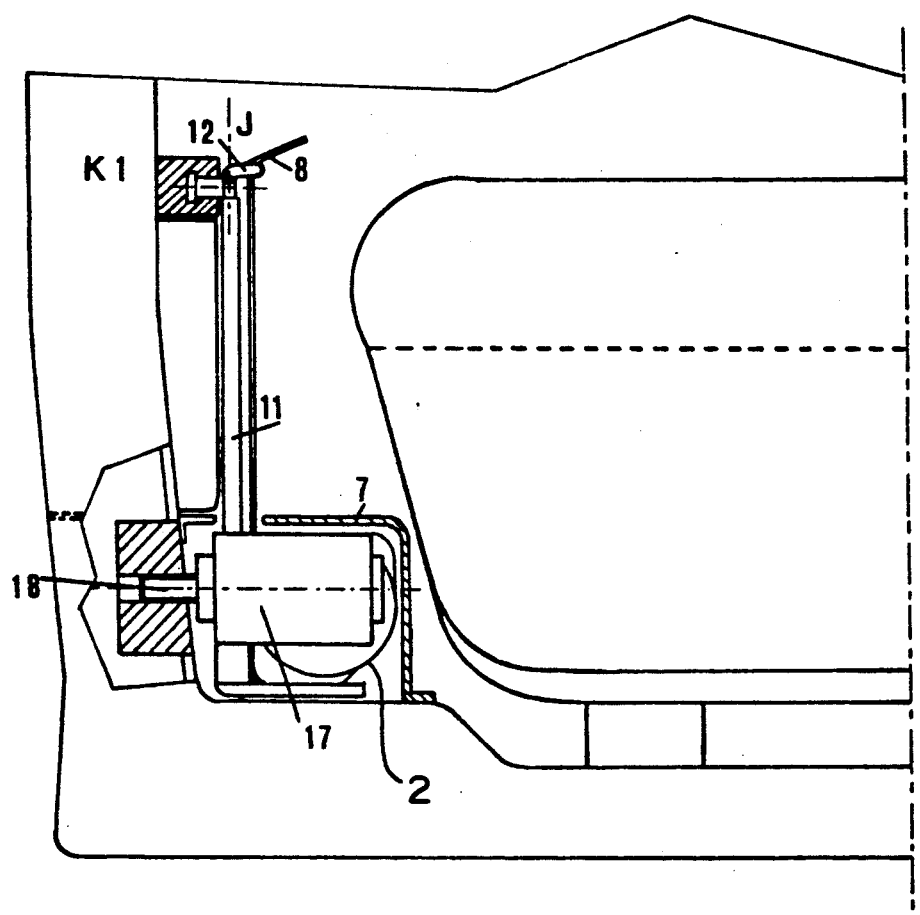
FIG. 5 is an enlarged side elevational view with portions shown in cross section of detail A as viewed toward the front of the vehicle, also showing an electromagnetic safety latch used in the present invention.
Figure 6:
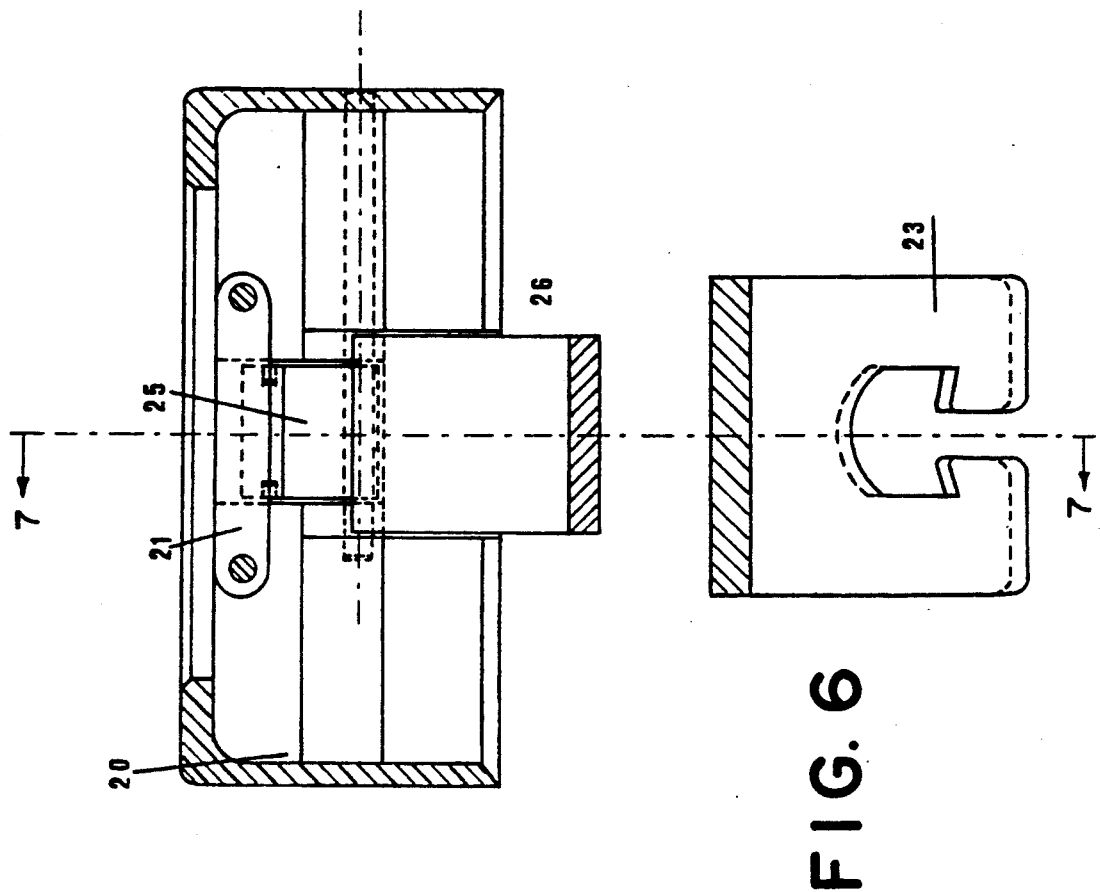
FIG. 6 is a clasping device used in the present invention, shown in cross section taken along line 6—6 in FIG. 7.
Figure 7:
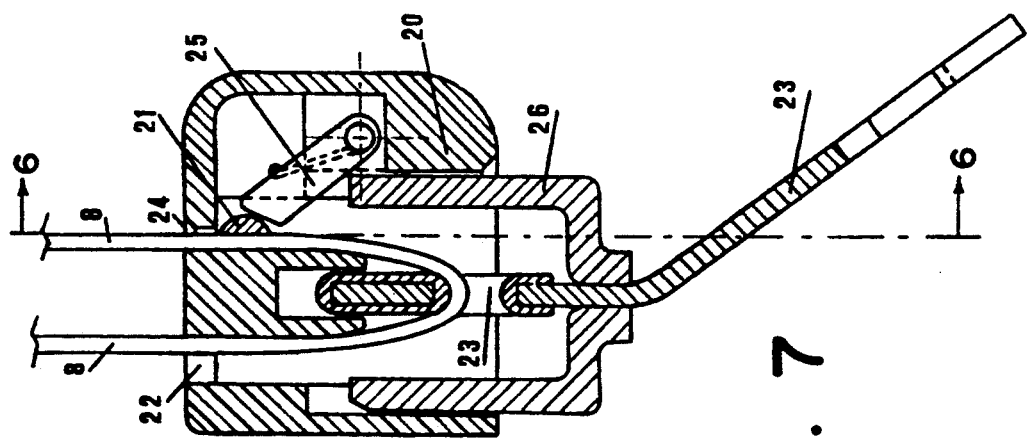
FIG. 7 is a cross sectional view of the clasping device taken along lines 7—7 in FIG. 6.

As soon as the engine is turned off or the automatic gear box is shifted into the parking position, power is automatically supplied to the motor 3, causing the retractor 2 and the sliding rod 12 to move along the sliding rail 1 and the profile 9, respectively, to bring the safety belt 8 into position K2 on the Y axis, as best shown in FIGS. 1 and 4. A motor 3A simultaneously moves a top belt coupling 14A from a W-axis position to a Z-axis position, as best shown in FIG. 1. The belt 8 thus comes into position as shown in FIG. 4, where it remains until the driver starts the car again, causing the retractor 2 and the sliding rod unit 12 and the top belt coupling 14A to return to their respective initial X axis and W axis positions, thus completing the cycle.

The movement of the retractor 2 along the sliding rail 1 is strictly linked to the movement of the top belt coupling 14A so that the safety belt 8 is always the same, starting from the respective couplings and passing through the side coupling rod (fixing rod) 14 from which the belt 8 is released only in case of an emergency, so that the system R is fully automatic and there is no need for the driver or the passenger to connect or release the safety belt 8.

The system R differs from the "Motorized Shoulder Belt" in that it is no longer necessary to strap into or out of the lap belt when getting into or out of the car, nor does the shoulder belt have to be released from its coupling in case of an emergency, as a simple action of pressing a release button 15 (shown in FIG. 4) is sufficient.

The top end of the telescopic sliding rod 12 is adjustable to adapt the slant of the safety belt 8, varying the pull-out position of the belt 8 with respect to the K-axis and the fixing rod 14 to which it is always attached (except in the case of an emergency when it is released by pressing the button 15), similar to the one fitted on conventional safety belts.

The top end of the profile 9 has a cover 16 in the sliding section near the door to insure personal safety, as best shown in FIG. 1.

An electromagnet locking pin is disposed inside the retractor 2 and the telescopic sliding rod assembly 12 to insure a perfectly reliable hook up of the whole device when the car is in motion. A pin 18 associated with the assembly 17 is naturally released as soon as the engine is switched off so that the cycle described above can be carried out.

A device 20 advantageously brings the belt into the position shown in FIG. 4 so that the driver and the passenger can easily get out of the car without being hindered by the belt 8, or when they return to the car as the whole system R remains in the same position and is only triggered when the engine is turned on. Turning on the engine makes the belt 8 return to its initial locking position at the X- and W-axes and thus completes the cycle.

The device 20 is a through buckle which uses the difference in safety belt length (from the W axis coupling to the hook up point on the K axis rod 14 and from the Z axis coupling to the hook up rod 14 that occurs during the transfer of movement in order to lift the belt 8 along the Z-K axis). This is made possible by a stay 21 attached to the belt 8 which is free to enter a duct 22 and past a tab 26, but is attached at 24, therefore dragging along the whole device 20. If, as illustrated above, the distance Z-K is less than K-W, the retractor 2 will consequently take up the excess belt, causing the above-described hook up with the tab 26 and the pulling effect.

When the safety belt 8 returns to the stop position W, the stay 21 remains attached to the device 20, given that it has passed earlier by a spring ratchet gear 25 until it comes into contact with the tab 26 welded onto the other end of part 23, causing the stay 21 to be released so that the belt 8 slides freely after the buckle 20 has been returned to its starting point.

I claim:

1. A passive safety seat belt system for an occupant on a seat of a motor vehicle having a frame and a least a door, comprising:
    a) first guide disposed on an outboard side of the seat secured to the frame below the door;
    b) retractor adapted to move along said first guide between a first position behind the door and a second position in front of the door;
    c) second guide disposed above the door;
    d) a first anchor adapted to move along said second guide between a third position behind the door and a fourth position toward the front of the door;
    e) a second anchor disposed inboard of the seat;
    f) a belt having a first end secured to said first anchor, a second end secured to said retractor, and an intermediate portion secured to said second anchor;
    g) first drive operably engaged with said retractor for positioning said retractor at said first and second positions;
    h) second drive operably engaged with said first anchor for positioning said first anchor at said third and fourth;
    i) a third guide having a first portion disposed on the frame behind the door, a second portion disposed across the door and a third portion disposed in front of the door;
    j) said first portion is lower than said third portion;
    k) a telescoping assembly operably secured to said retractor, said belt and said third guide such that a belt portion adjacent the door is lifted upwardly when said retractor moves to said second position;
    l) whereby said belt secures the occupant to the seat when said retractor and said first anchor are disposed at said first and third positions, respectively, and said belt is released from the occupant when said retractor and said first anchor are disposed at said second and third positions, respectively.

2. A system as in claim 1, and further comprising:
    a) a lock operably secured to said retractor for securing said retractor to the frame when said retractor is in said first position.

3. A system as in claim 1, and further comprising:
    a) a sliding buckle operably secured to said belt.

4. A system as in claim 2, wherein:
    a) said lock includes an electromagnetic pin assembly.

5. A system as in claim 1, and further comprising:
    a) a manual release operably secured to said second anchor for releasing said belt therefrom.

6. A passive safety seat belt system for an occupant on a seat of a motor vehicle having a frame and at least a door, comprising:
    a) an automatic shoulder belt;
    b) a lap belt cooperating with said shoulder belt;
    c) a retractor operably secured to one end of said lap belt and operably secured to the frame;
    d) an anchor operably secured to the other end of said lap belt;
    e) a first guide disposed on an outboard side of the seat and secured to the frame below the door;
    f) said retractor is operably secured to said guide and adapted to move along said guide between a first position behind the door and a second position in front of the door;
    g) a drive operably engaged with said retractor for positioning said retractor at said first and second positions;
    h) a second guide having a first portion disposed on the frame behind the door, a second portion disposed across the door and a third portion disposed in front of the door;
i) said first portion is lower than said third portion; and
j) a telescoping assembly operably secured to said retractor, said lap belt and said second guide such that a belt portion adjacent the door is lifted upwardly when said retractor moves to said second position;

7. A system as in claim 6, and further comprising:
a) a sliding buckle operably secured to said lap belt and slidable with said shoulder belt; and
b) said sliding buckle is engaged to said anchor when said retractor is in said first position and disposed away from said anchor when said retractor is in said second position.

8. A system as in claim 6, and further comprising:
a) a lock operably secured to said retractor and the frame when said retractor in said first position.

9. A system as in claim 6, and further comprising:
a) a manual release operably secured to said lap and shoulder belts.

* * * * *